US010158434B2

(12) United States Patent
Trotta et al.

(10) Patent No.: US 10,158,434 B2
(45) Date of Patent: Dec. 18, 2018

(54) CIRCUIT, SYSTEM, AND METHOD FOR OPERATING AND CALIBRATING A RADIO FREQUENCY TRANSCEIVER

(71) Applicant: Infineon Technologies AG, Neubiberg (DE)

(72) Inventors: Saverio Trotta, Munich (DE); Reinhard Wolfgang Jungmaier, Vaterstetten (DE); Dennis Noppeney, Cologne (DE); Johann Peter Forstner, Steinhoering (DE); Ismail Nasr, Unterhaching (DE); Vadim Issakov, Munich (DE); Andreas Wickmann, Nuremberg (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/333,077

(22) Filed: Oct. 24, 2016

(65) Prior Publication Data
US 2018/0115371 A1    Apr. 26, 2018

(51) Int. Cl.
| H04B 17/00 | (2015.01) |
| H04B 17/14 | (2015.01) |
| H04B 17/21 | (2015.01) |
| H04B 1/38 | (2015.01) |

(52) U.S. Cl.
CPC ............ *H04B 17/14* (2015.01); *H04B 1/38* (2013.01); *H04B 17/21* (2015.01)

(58) Field of Classification Search
USPC ........................................ 455/67.11, 73, 209
See application file for complete search history.

(56) References Cited

U.S. PATENT DOCUMENTS

| 4,025,719 | A | * | 5/1977 | Nussbaumer | ........... | H04L 27/01 |
| | | | | | | 375/235 |
| 4,965,853 | A | * | 10/1990 | Barnard | .................. | H01L 24/49 |
| | | | | | | 455/209 |
| 6,278,864 | B1 | * | 8/2001 | Cummins | ................ | H04B 1/38 |
| | | | | | | 455/73 |
| 2004/0106380 | A1 | * | 6/2004 | Vassiliou | ............... | H04B 17/14 |
| | | | | | | 455/73 |
| 2007/0254592 | A1 | * | 11/2007 | McCallister | .......... | H03F 1/0205 |
| | | | | | | 455/67.11 |
| 2009/0258626 | A1 | | 10/2009 | Yamada et al. | | |
| 2010/0080270 | A1 | * | 4/2010 | Chen | ....................... | H03F 1/223 |
| | | | | | | 375/219 |
| 2015/0185314 | A1 | | 7/2015 | Corcos et al. | | |
| 2016/0092099 | A1 | | 3/2016 | Wellhoefer et al. | | |

FOREIGN PATENT DOCUMENTS

| DE | 102014014498 A1 | 3/2016 |
| EP | 1820277 B1 | 2/2010 |

* cited by examiner

*Primary Examiner* — Ganiyu A Hanidu
(74) *Attorney, Agent, or Firm* — Slater Matsil, LLP

(57) ABSTRACT

In accordance with an embodiment, a method for operating a radio frequency (RF) transceiver includes frequency-translating, using a local oscillator signal having a calibrated phase shift, a signal received at an antenna of an RF transceiver; filtering the frequency-translated signal using a programmable filter of the RF transceiver to produce a filtered frequency-translated signal; and changing a cutoff frequency of the programmable filter from a first cutoff frequency to a second cutoff frequency in response to the RF transceiver switching operation from a first mode to a second mode.

27 Claims, 8 Drawing Sheets

CIRCUIT, SYSTEM, AND METHOD FOR OPERATING AND CALIBRATING A RADIO FREQUENCY TRANSCEIVER

TECHNICAL FIELD

The present disclosure relates generally to a radar system, and, in particular embodiments, to a system and method for operating and calibrating a radio frequency (RF) transceiver of the radar system.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for mm-wave applications at 60 GHz, 77 GHz, and 80 GHz and also beyond 100 GHz. Such applications include, for example, automotive radar systems and multi-gigabit communication systems.

In some radar systems, the distance between the radar and a radar target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF, as well as the associated RF circuitry used to generate the transmitted signal and to receive the RF signal. In some cases, multiple antennas may be used to implement directional beams using phased array techniques.

SUMMARY

In an embodiment, a method includes frequency-translating, using a local oscillator signal having a calibrated phase shift, a signal received at an antenna of a radio frequency (RF) transceiver; filtering the frequency-translated signal using a programmable filter of the RF transceiver to produce a filtered frequency-translated signal; and changing a cutoff frequency of the programmable filter from a first cutoff frequency to a second cutoff frequency in response to the RF transceiver switching operation from a first mode to a second mode.

In an embodiment, a circuit includes a mixer having an input port configured to be coupled to an antenna of a radio frequency (RF) transceiver; and a selectable local oscillator (LO) phase circuit coupled to an LO port of the mixer, the selectable LO phase circuit configured to provide a calibrated phase shift to a local oscillator signal. The circuit further includes a filter coupled to an output of the mixer, the filter having a selectable cutoff frequency; and a controller coupled to the filter, wherein the controller is configured to change a cutoff frequency of the filter from a first cutoff frequency to a second cutoff frequency in response to the RF transceiver switching operation from a first mode to a second mode.

In an embodiment, a radar system includes a transmit antenna configured to transmit a radar signal; and a receive antenna configured to receive a reflected radar signal, the reflected radar signal including at least one of a parasitic signal generated by a coupling between the receive antenna and the transmit antenna or a local echo signal generated by a reflection of the radar signal from a stationary target in close proximity to the transmit antenna and receive antenna. The radar system further includes a mixer coupled to the receive antenna and configured to downconvert, using a local oscillator signal having a calibrated phase shift, the reflected radar signal to produce a downconverted reflected radar signal. The radar system additionally includes a processing circuit coupled to an output of the mixer, the processing circuit including a filter having a first bandwidth, the filter being configured to filter the downconverted reflected radar signal; and a controller configured to change a bandwidth of the filter from the first bandwidth to a second bandwidth in response to the radar system switching operation from an inactive mode to an active mode.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

The present disclosure describes preferred embodiments in a specific context, such as a radar system used for a gesture sensing system or a portable consumer device. However, the invention can also be applied to other systems and applications, such as general radar systems and wireless communications systems.

In an embodiment, a circuit, included in an RF front end of a radar system, can remove, or at least reduce, analog-to-digital convertor (ADC) saturation and amplitude clipping caused by close-in reflections and the parasitic transient signals that are generated when the radar system switches operation from first mode to second mode. The circuit may be operated to determine a calibrated phase shift based on a phase calibration that sets a direct current (DC) level of a phase test signal at an intermediate frequency. The calibrated phase shift shifts the phase of low frequency tones at the intermediate frequency so that the DC offset of the overall resulting time-domain signal does not clip. Furthermore, the circuit may be operated to determine a calibrated gain based on a gain calibration that reduces amplitude clipping of a gain test signal. The calibrated gain increases the overall gain of the RF front end so that the low amplitude deviations caused by reflected RF signal off an object of interest may be amplified as much as possible without causing clipping of a signal in the RF front end, thereby improving detection of the reflected RF signal by the RF front end.

Figure 1:
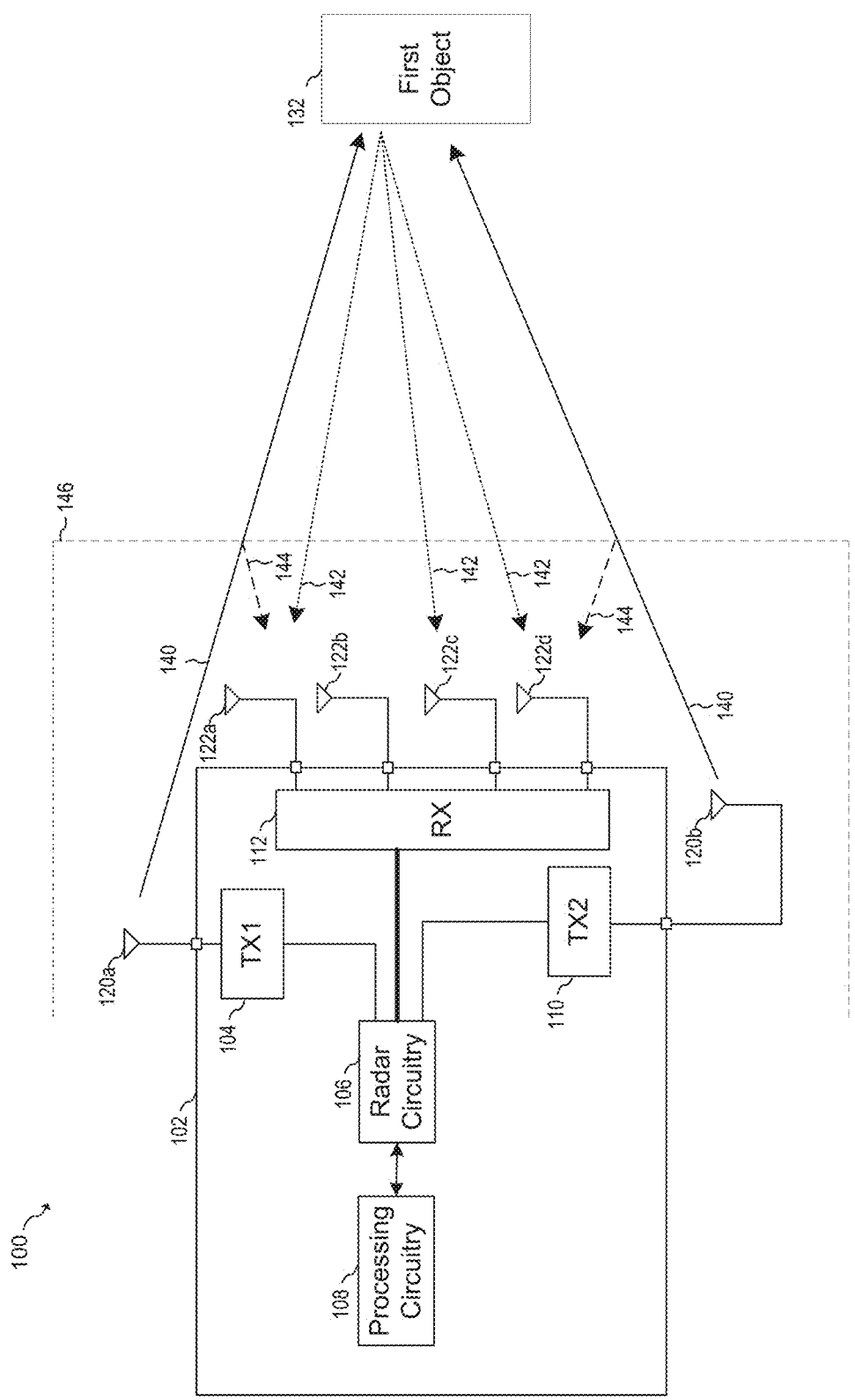
FIG. 1 shows a block diagram of radar system, in accordance with an embodiment.

FIG. 1 illustrates a block diagram of a radar system 100, in accordance with an embodiment. In some embodiments, radar system 100 can be used for a portable consumer device (e.g. a watch). The frequency of operation of radar system 100, as well as other embodiments disclosed herein, can be between about 24 GHz and about 120 GHz. Alternatively, embodiment radar systems can operate at frequencies outside this range.

Radar system 100 includes radio frequency (RF) transceiver 102, which includes transmit antenna 120a, transmit antenna 120b, and receive antennas 122a-d. In the example illustrated in FIG. 1, two transmit antennas 120a and 120b are shown; however, in other embodiments, the number of transmit antennas may be less than two or more than two. Similarly, four receive antennas 122a-d are shown in the example of FIG. 1; however, in other embodiments, the number of receive antennas may be less than four or more than four. In some embodiments, radar system 100 may include an antenna array having receive antennas 122a-d. In other embodiments, a single antenna may function as the transmit antenna and the receive antenna of RF transceiver 102.

In the example shown in FIG. 1, RF transceiver 102 is configured to transmit incident RF signal 140 towards first object 132 via transmit antenna 120a and transmit antenna 120b. First object 132 may be referred to as a radar target. Incident RF signal 140 reflects off first object 132 and returns to RF transceiver 102 as reflected RF signal 142. In some embodiments, a relative speed, distance, position, orientation, or phase of first object 132 modulates incident RF signal 140, and the modulation of incident RF signal 140 returns to RF transceiver 102 as reflected RF signal 142. RF transceiver 102 is configured to receive reflected RF signal 142 via receive antennas 122a-d. Information (e.g. relative speed, distance, position, orientation, or phase) about first object 132 may be obtained by processing reflected RF signal 142. Consequently, the signal of interest in radar system 100 is reflected RF signal 142. It should be understood that first object 132 is not a part of radar system 100, but is shown within FIG. 1 for clarity.

As an example, in some embodiments, radar system 100 is implemented as a frequency modulated continuous wave (FMCW) radar sensor having two transmit channels and four receive channels to realize a digital beam forming holographic radar, such that relative speed, distance, and phase of first object 132 in the field of view (FOV) of antennas 120a, 120b, and 122a-d are measured. As another example, in some embodiments, first object 132 may be a gesturing hand. In such embodiments, during operation of radar system 100, the position and gestures of the hand may be detected by at least one of RF transceiver 102 or processing circuitry coupled thereto. For example, RF transceiver 102 may be coupled to a computer system, appliance, or other device, and the detected gestures may be used as input to the computer system or various devices. As an illustration, a gesture of two fingers tapping each other could be interpreted as a "button press," or a gesture of a rotating thumb and finger may be interpreted as turning of a dial.

RF transceiver 102 also includes receiver front end 112, first transmitter front end 104, and second transmitter front end 110. Receiver front end 112 is coupled to receive antennas 122a-d; first transmitter front end 104 is coupled to transmit antenna 120a; and second transmitter front end 110 is coupled to transmit antenna 120b. RF transceiver 102 further includes radar circuitry 106, which is coupled to receiver front end 112, first transmitter front end 104, and second transmitter front end 110. Radar circuitry 106 provides signals to be transmitted to first transmitter front end 104 and second transmitter front end 110. Radar circuitry 106 also receives signals received by receiver front end 112.

RF transceiver 102 includes processing circuitry 108, which processes signals received by receiver front end 112 and controls transmissions by first transmitter front-end 104 and second transmitter front end 110. RF transceiver 102 may frequency-translate reflected RF signal 142 to an intermediate frequency (IF). Circuitry for translating a frequency of reflected RF signal 142 to the IF may be included in at least one of processing circuitry 108, radar circuitry 106, or receiver front end 112. Reflected RF signal 142 may be downconverted to an IF that is lower than a carrier frequency of reflected RF signal 142. In other embodiments, reflected RF signal 142 may be upconverted to an IF that is higher than the carrier frequency of reflected RF signal 142. The IF may be a frequency, or a range of frequencies, to which reflected RF signal 142 is shifted, and this may include a baseband frequency of 0 Hz. As an example, in some embodiments, the IF may be between about 10 kHz and about 500 kHz, or between about 100 kHz and about 1 MHz. In some other embodiments, the IF may be between about 0 Hz (e.g. baseband frequency) and about 5 kHz.

RF transceiver 102, or portions thereof, may be implemented in a package that includes first transmitter front end 104, second transmitter front end 110, receiver front end 112, transmit antennas 120a and 120b, and receive antennas 122a-d. In some embodiments, RF transceiver 102 may be implemented as one or more integrated circuits disposed on a circuit board. In such embodiments, transmit antennas 120a and 120b and receive antennas 122a-d may be implemented on the circuit board adjacent to the one or more integrated circuits implementing RF transceiver 102.

Radar system 100 may switch operation from a first mode to a second mode. In some embodiments, it is RF transceiver 102 of radar system 100 that switches operation from first mode to second mode. In such embodiments, in the first mode, RF transceiver 102 does not actively transmit incident RF signal 140 (e.g. via transmit antennas 120a, 120b) or actively receive reflected RF signal 142 (e.g. via receive antennas 122a-d). In other words, the first mode of RF transceiver 102 may be a sleep mode or an inactive mode, where various components or functions of RF transceiver 102 are disabled (e.g. to conserve power). On the other hand, in the second mode, RF transceiver 102 actively transmits incident RF signal 140 (e.g. via transmit antennas 120a, 120b) and/or actively receives reflected RF signal 142 (e.g. via receive antennas 122a-d). In other words, the second mode of RF transceiver 102 may be an active mode or functional mode.

Radar system 100 may suffer from a parasitic transient signal that may be produced when RF transceiver 102 switches operation from first mode to second mode. The parasitic transient signal may propagate through RF transceiver 102 until an ADC included in RF transceiver 102, thereby saturating the ADC of RF transceiver 102. The parasitic transient signals may manifest themselves at or near a direct current (DC) level in the IF domain. In embodiments where radar system 100 is configured to switch from first mode to second mode every D duty cycles, the parasitic transient signals may be generated every D duty cycles.

Radar system 100 also suffers from close-in reflections 144 that propagate into a receive path that includes receive antennas 122a-d, radar circuitry 106, and processing circuitry 108. Close-in reflections 144 may be generated as a result of reflections of incident RF signal 140 off a second object 146 that is stationary relative to receive antennas 122a-d and transmit antennas 120a and/or 120b. As an example, second object 146 may be at least one of a radome or a package cover. As another example, second object 146 may be a cover of an integrated chip (IC) package that includes first transmitter front end 104, second transmitter front end 110, receiver front end 112, transmit antennas 120a and 120b, and receive antennas 122a-d. Another example of close-in reflections 144 may be short-range (SR) signal leakage as a result of parasitic RF coupling between receive antennas 122a-d and at least one of transmit antenna 120a or transmit antenna 120b. SR signal leakage may be caused, at least in part, by the close proximity between receive antennas 122a-d and at least one of transmit antenna 120a or transmit antenna 120b.

Frequency content (e.g. a frequency spectrum) of close-in reflections 144 may be proportional to a time needed for incident RF signal 140 to travel a distance between transmit antennas 120a, 120b and second object 146 and return to receive antennas 122a-d as close-in reflections 144. This time is referred to herein as second object round-trip delay time. The frequency content of close-in reflections 144 may also depend, at least in part, on modulation parameters of radar system 100. In some embodiments, such as in a gesture recognition system, first object 132 is no more than about 30 centimeters from receive antennas 122a-d and transmit antennas 120a, 120b. Consequently, with a modulation between about 6 GHz and about 7 GHz, and second object round-trip delay time of about 44 microseconds, close-in reflections 144 may have frequency content about 15 kHz and about 65 kHz from the DC level in the IF domain. On the other hand, frequency content of reflected RF signal 142 (namely, the signal of interest), in the IF domain, may be at or near (e.g. about 30 kHz to about 50 kHz from) the DC level in the IF domain.

The signal received at receive antennas 122a-d is a superposition of reflected RF signal 142 (which is the signal of interest), parasitic transient signals, and close-in reflections 144. As a result of the closeness, in the IF domain, between frequency content of reflected RF signal 142, parasitic transient signals, and close-in reflections 144, merely filtering (e.g. high-pass filtering) signal received at receive antennas 122a-d may not be sufficient in removing the unwanted frequency content of close-in reflections 144 and parasitic transient signals, while leaving the frequency content of reflected RF signal 142 unperturbed.

Figure 2:
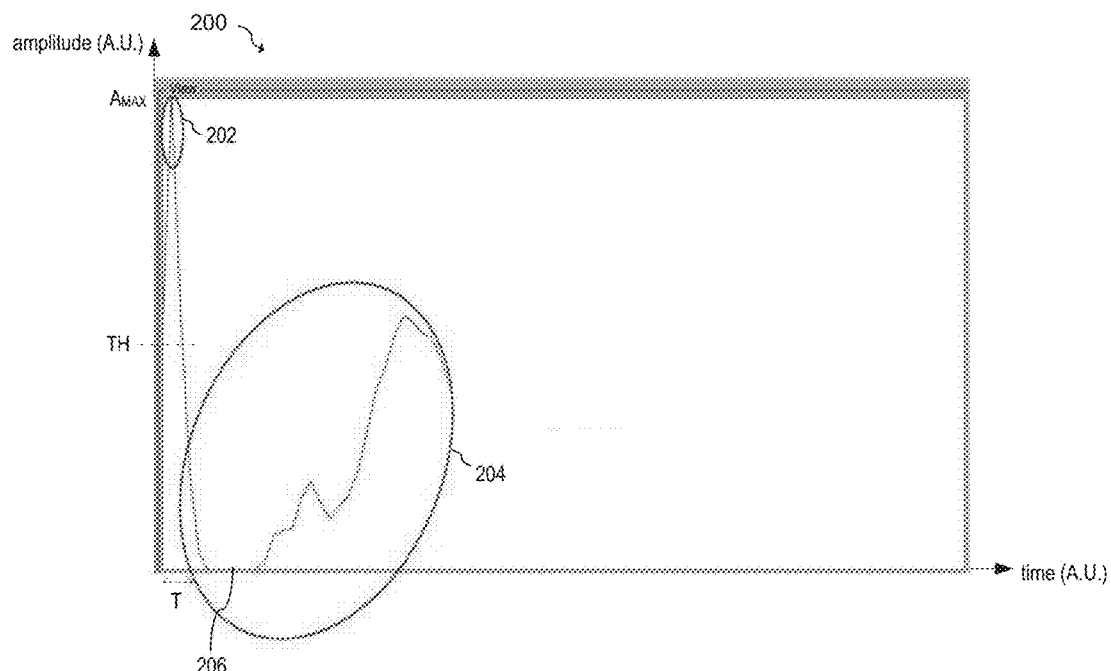
FIG. 2 shows time-domain behaviour, at an intermediate frequency, of a signal received by an RF transceiver of a radar system, in accordance with an embodiment.

FIG. 2 illustrates time-domain behaviour, at the IF, of a signal 200 received by RF transceiver 102, in accordance with an embodiment. The horizontal axis indicates time (in arbitrary units) while the vertical axis indicates amplitude (in arbitrary units). Signal 200 may be obtained after the signal received at receive antennas 122a-d is frequency-translated to the IF. As illustrated in the example of FIG. 2, signal 200 includes first signal portion 202 and second signal portion 204.

First signal portion 202 of signal 200 is a rapid amplitude spike that is caused by the parasitic transient signals propagating into at least one of radar circuitry 106 or processing circuitry 108 in response to radar system 100 switching operation from first mode to second mode. In some embodiments, RF transceiver 102 may include an ADC (not shown in figures, and which may be included in a processing circuit of RF transceiver 102, such as a baseband processing circuit). The rapid amplitude spike in first signal portion 202 may lead to saturation of the ADC and this may result in detection errors in RF transceiver 102, which may limit performance and robustness of radar system 100.

Second signal portion 204 of signal 200 has large amplitude fluctuations, which are caused by close-in reflections 144. On the other hand, reflected RF signal 142 (namely, the signal of interest) manifests itself as low amplitude deviations (e.g. small variations) from the large amplitude fluctuations of second signal portion 204. Stated in another way, the low amplitude variations of reflected RF signal 142 ride on the large amplitude fluctuations of close-in reflections 144. Consequently, signal 200 needs to be amplified in order for RF transceiver 102 to effectively detect and process the low amplitude deviations caused by reflected RF signal 142 so that information (e.g. relative speed, distance, position, orientation, or phase) about first object 132 may be obtained.

However, as illustrated in the example of FIG. 2, the large amplitude fluctuations caused by close-in reflections 144 may lead to clipping of signal 200 (indicated in FIG. 2 as region 206 of second signal portion 204). As a result of clipping 206 of signal 200, an amplifier may be unable to detect the low amplitude deviations of reflected RF signal 142. The clipping of signal 200 may also lead to saturation of the ADC of RF transceiver 102. This, in turn, may lead to detection errors in RF transceiver 102, which may limit performance of radar system 100. Stated in another way, strong (e.g. high amplitude) close-in reflections 144 may saturate at least one of an amplifier or the ADC of RF transceiver 102, thereby making detection of weak (e.g. low amplitude) reflected RF signal 142 difficult or nearly impossible.

In view of the above-described limitations of radar system 100, a method for removing, or at least reducing, effects (such as ADC saturation and amplitude clipping) caused by close-in reflections 144 and parasitic transient signals in radar system 100 is needed.

Figure 3:
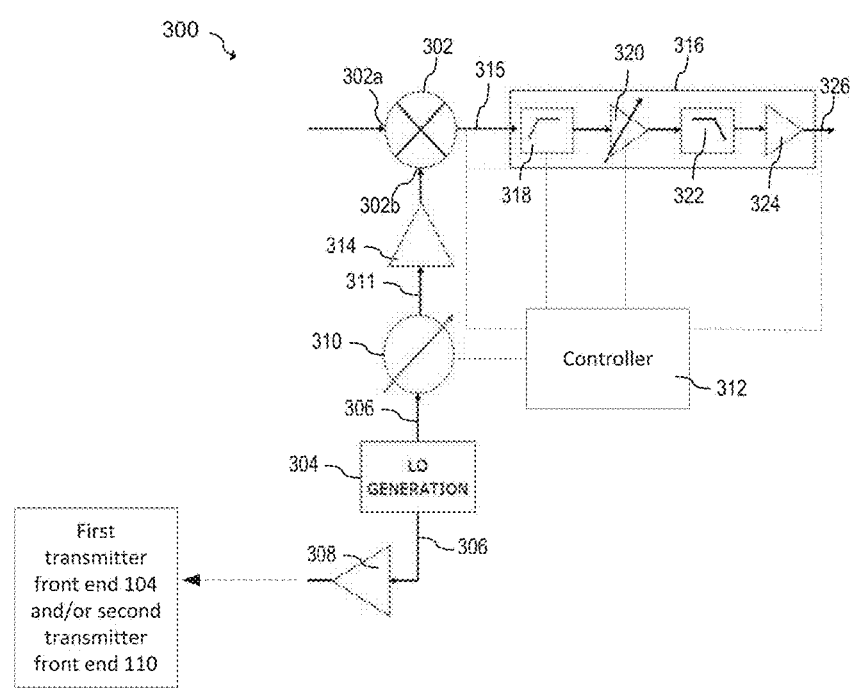
FIG. 3 shows a schematic of a circuit, in accordance with an embodiment.

FIG. 3 illustrates a schematic of a circuit 300, in accordance with an embodiment. Circuit 300 is an embodiment of at least a portion of an RF front end. Use of circuit 300 may remove, or at least reduce, effects (such as ADC saturation and amplitude clipping) caused by close-in reflections 144 and parasitic transient signals that are generated when the radar system 100 switches operation from first mode to second mode. For example, circuit 300 may remove, or at least reduce, the rapid amplitude spike of first signal portion 202 of signal 200. Circuit 300 may also remove, or at least reduce, clipping 206 of second signal portion 204 of signal 200. With the removal, or reduction, of these effects, saturation of a gain of at least one of an amplifier or the ADC of RF transceiver 102 may be avoided. This, in turn, may decrease the number of detection errors in RF transceiver 102 and, thereby improving performance of radar system 100.

At least a portion of circuit 300 may be included in RF transceiver 102. Circuit 300 may be used to calibrate RF transceiver 102. Circuit 300 may also be used during operation of RF transceiver 102. Circuit 300 includes mixer 302 having input port 302a configured to be coupled to an antenna of RF transceiver 102. As an example, input port 302a is configured to be coupled to at least one of receive antennas 122a-d of radar system 100. Mixer 302 is configured to frequency-translate (e.g. downconvert), to the IF, a signal received at an antenna of RF transceiver 102 (e.g. at least one of receive antennas 122a-d).

Circuit 300 also includes local oscillator (LO) 304 configured to generate LO signal 306. As an example, LO 304 may be implemented using a voltage controlled oscillator (VCO) that provides LO signal 306 having a frequency that is set according to an input voltage to the VCO. In some embodiments, LO signal 306 is provided to at least one of first transmitter front end 104 or second transmitter front end 110. In some embodiments, such as in the example shown in FIG. 3, an output of LO 304 is coupled to an input of a first amplifier 308, and an output of first amplifier 308 is coupled to at least one of first transmitter front end 104 or second transmitter front end 110.

Circuit 300 includes selectable local oscillator (LO) phase circuit 310, which is configured to shift a phase of LO signal 306 by a calibrated phase shift. Selectable LO phase circuit 304 may be referred to as a programmable phase shifter. In some embodiments, selectable LO phase circuit 310 may be integrated on a chip including at least a portion of RF transceiver 102. Circuit 300 also includes controller 312, which is communicatively coupled to selectable LO phase shift circuit 310. Controller 312 is configured to determine the calibrated phase shift and control the selectable LO phase circuit 310 to shift the phase of LO signal 306 by the calibrated phase shift to produce calibrated LO signal 311.

Selectable LO phase circuit 304 is coupled to an LO port 302b of mixer 302. In some embodiments, such as in the example shown in FIG. 3, an output of selectable LO phase circuit 304 is coupled to an input of second amplifier 314, and an output of second amplifier 314 is coupled to LO port 302b of mixer 302. Selectable LO phase circuit 310 may be implemented by LO phase-shifting schemes known in the art, examples being an in-phase-quadrature (I-Q) vector modulator and a ring oscillator (e.g. a ring VCO), although other programmable phase shifters may be used in other embodiments.

Figure 4:
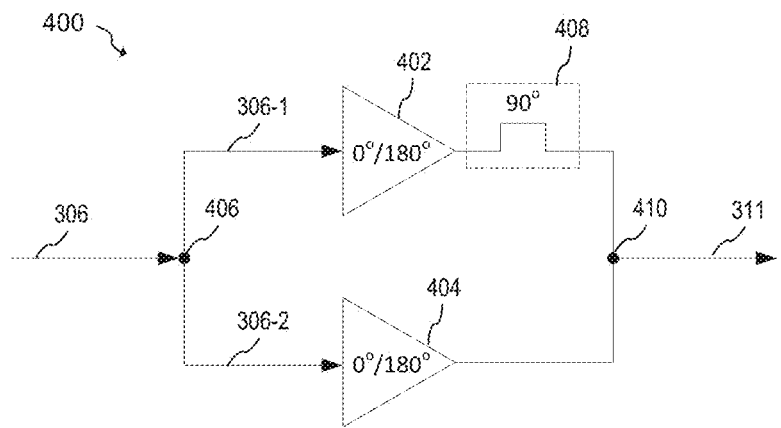
FIG. 4 shows a schematic of an in-phase-quadrature phase (I-Q) vector modulator, in accordance with an embodiment.

FIG. 4 shows a schematic of I-Q vector modulator 400, in accordance with an embodiment. I-Q vector modulator 400 may be used to implement selectable LO phase circuit 310. I-Q vector modulator 400 includes first ON/OFF bi-phase modulator 402 connected in parallel to second ON/OFF bi-phase modulator 404. As shown in FIG. 4, LO signal 306 received at node 406 is divided into two equal outputs, including a first LO signal 306-1 that passes to an input of first ON/OFF bi-phase modulator 402 and a second LO signal 306-2 that passes to an input of second ON/OFF bi-phase modulator 404. Each LO signal 306-1, 306-2 passes through its respective ON/OFF bi-phase modulator 402, 404, which has a 0 degree or 180 degree state. Controller 312 is communicatively coupled to first ON/OFF bi-phase modulator 402 and second ON/OFF bi-phase modulator 404 and controls selection of the 0 degree or 180 degree state of the ON/OFF bi-phase modulators 402, 404. The output of first ON/OFF bi-phase modulator 402 is subjected to a 90 degree phase rotation by circuit 408. Consequently, the circuit path including first ON/OFF bi-phase modulator 402 is a quadrature (Q) channel, while the circuit path including second ON/OFF bi-phase modulator 404 is an in-phase (I) channel.

Outputs of second ON/OFF bi-phase modulator 404 and circuit 408 are combined at node 410 to produce calibrated LO signal 311. In the example of FIG. 4, I-Q vector modulator 400 has seven different phase settings, each of which shifts the phase of LO signal 306 by a respective phase shift. For the I-Q vector modulator 400 illustrated in FIG. 4, the respective phase shifts are 0 degrees, 45 degrees, 90 degrees, 135 degrees, 180 degrees, 225 degrees, 270 degrees, and 315 degrees. In the example of FIG. 4, controller 312 determines the calibrated phase shift from the set of phase shifts including 0 degrees, 45 degrees, 90 degrees, 135 degrees, 180 degrees, 225 degrees, 270 degrees, and 315 degrees.

Referring back to FIG. 3, calibrated LO signal 311 (or an amplified version thereof) is provided to LO port 302b of mixer 302. Mixer 302 is configured to frequency-translate (e.g. downconvert) a signal received at an antenna of RF transceiver 102 to the IF, using calibrated LO signal 311, to produce frequency-translated signal 315.

Circuit 300 also includes processing circuit 316. Frequency-translated signal 315 is provided as an input to processing circuit 316. In some embodiments, processing circuit 316 is included in an IF processing circuit of RF transceiver 102. In other embodiments, processing circuit 316 is included in a baseband processing circuit of RF transceiver 102. Processing circuit 316 includes first filter 318, third amplifier 320, second filter 322, and fourth amplifier 324. In the example shown in FIG. 3, first filter 318 is illustrated as a high-pass filter. First filter 318 is configured to have a selectable or programmable cutoff frequency and a selectable or programmable gain. First filter 318 is communicatively coupled to controller 312. In some embodiments, first filter 318 may be referred to as a programmable filter. Controller 312 is configured to change the cutoff frequency of first filter 318. Controller 312 is also configured to change the gain of first filter 318.

Figure 5:
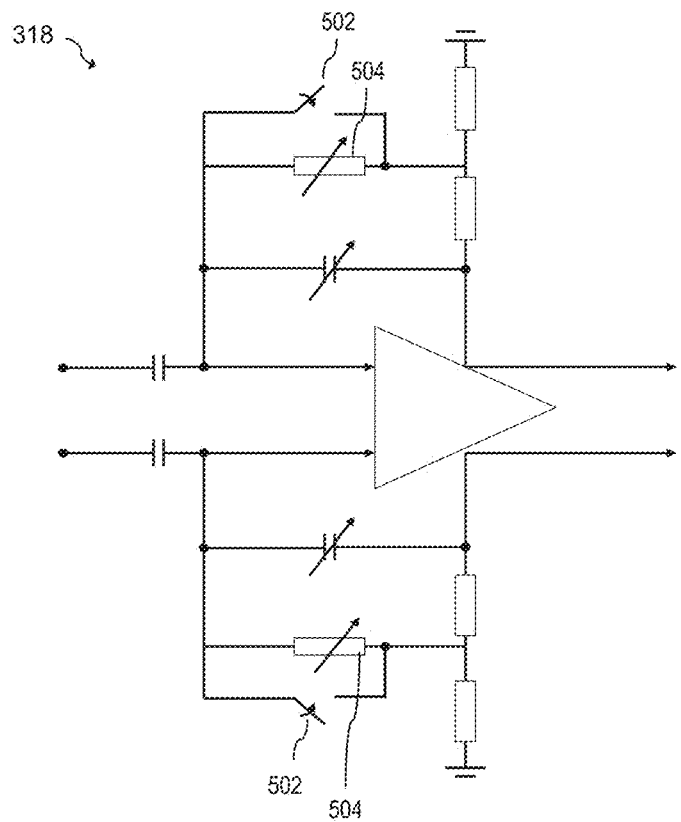
FIG. 5 shows a schematic of a filter of the circuit shown in FIG. 3, in accordance with an embodiment.

FIG. 5 shows a schematic of first filter 318 of circuit 300, in accordance with an embodiment. In the example shown in FIG. 5, first filter 318 is an active high-pass filter having a switch 502 (e.g. a programmable switch) operationally coupled thereto. For example, switch 502 is connected in parallel to feedback resistor 504 of the active high-pass filter. Controller 312 is configured to control switch 502 (e.g. open and close switch 502) such that the cutoff frequency of first filter 318 is changed. As such, switch 502 may be referred to as a cutoff frequency selection switch. In some embodiments, controller 312 causes switch 502 to close in response to RF transceiver 102 switching operation from first mode to second mode, thereby increasing the cutoff frequency of first filter 318. For example, when switch 502 is closed, cutoff frequency of first filter 318 is increased from an initial cutoff frequency to a higher cutoff frequency. As another example, when switch 502 is opened, cutoff frequency of first filter 318 is decreased from an initial cutoff frequency to a lower cutoff frequency.

FIG. 5 shows feedback resistor 504 as being a variable resistor (e.g. a programmable resistor). In some embodiments, variable resistor 504 may be implemented as a switchable resistance network having a plurality of selectable resistance values. In some embodiments, controller 312 is communicatively coupled to feedback resistor 504 and is configured to vary a resistance of feedback resistor 504. As an example, controller 312 is configured to select a resistance value from the plurality of selectable resistance values of feedback resistor 504, thereby changing the resistance of feedback resistor 504. By changing the resistance of feedback resistor 504, controller 312 may change at least one of the gain or cutoff frequency of first filter 318.

As described above, the cutoff frequency of first filter 318 may be changed by switch 502 and feedback resistor 504. However, the magnitude of the change in cutoff frequency produced by switch 502 may be different from the magnitude of the change in cutoff frequency produced by feedback resistor 504. In some embodiments, changing a resistance of feedback resistor 504 may change the cutoff frequency of first filter 318 from a first cutoff frequency being in a range from about 20 kHz and about 50 kHz (e.g. about 35 kHz) to a second cutoff frequency being in a range from about 100 kHz and about 200 kHz (e.g. about 150 kHz). In comparison, closing switch 502 may cause a greater change in the cutoff frequency of first filter 318. As an example, closing switch 502 may change the cutoff frequency of first filter 318 from a set cutoff frequency (which may be between about 35 kHz and about 150 kHz) to a higher cutoff frequency (which may be greater than about 5 MHz, such as greater than about 10 MHz, as an example).

Referring back to FIG. 3, an output of first filter 318 is coupled to an input of third amplifier 320, which in the example shown in FIG. 3 may be a variable gain amplifier (VGA). An output of third amplifier 320 is filtered by second filter 322, and the output of second filter 322 is amplified by fourth amplifier 324. In some embodiments, an output of fourth amplifier 324 is an output of processing circuit 316, which is indicated in FIG. 3 as output signal 326. Output signal 326 may be an input signal to the ADC of RF transceiver 102.

Figure 6:
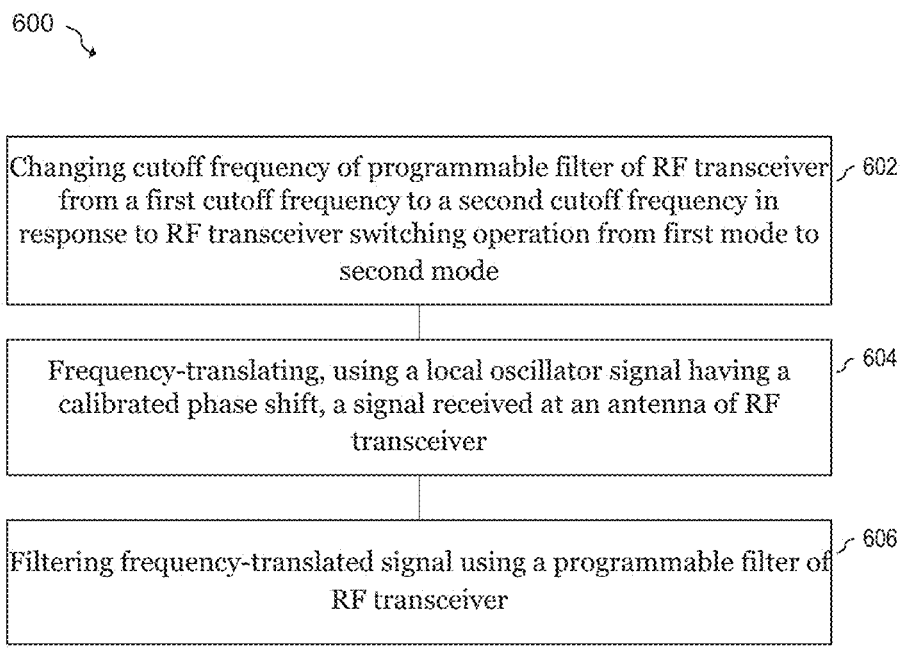
FIG. 6 shows a flowchart illustrating a method for operating the circuit shown in FIG. 3, in accordance with an embodiment.

FIG. 6 shows a flowchart illustrating a method 600 for operating circuit 300, in accordance with an embodiment. Operating circuit 300 in accordance with method 600 may remove, or at least reduce, effects (such as ADC saturation and amplitude clipping) caused by close-in reflections 144 and the parasitic transient signals generated when the radar system 100 switches operation from first mode to second mode.

As shown in FIG. 6, method 600 includes changing cutoff frequency of programmable filter of RF transceiver 102 from a first cutoff frequency to a second cutoff frequency in response to RF transceiver 102 switching operation from first mode to second mode (in step 602). Method 600 also includes frequency-translating, using a local oscillator signal having a calibrated phase shift, a signal received at an antenna of RF transceiver 102 (in step 604). Method 600 further includes filtering the frequency-translated signal using a programmable filter of RF transceiver 102 (in step 606). Although the example shown in FIG. 6 shows frequency-translation (in step 604) being performed after changing the cutoff frequency (in step 602), in other embodiments of method 600, changing the cutoff frequency (in step 602) may be performed after frequency-translation (in step 604).

Referring to step 602 of method 600, cutoff frequency of a programmable filter of RF transceiver 102 is changed from a first cutoff frequency to a second cutoff frequency in response to RF transceiver 102 switching operation from first mode to second mode. Step 602 of method 600 may be performed by controller 312 and first filter 318. For example, as described above in relation to FIG. 3, controller 312 is configured to change the cutoff frequency of first filter 318 by controlling switch 502 to open and close. In some embodiments, first cutoff frequency may be between about 20 kHz and about 200 kHz (e.g. in a range from about 35 kHz to about 150 kHz), while second cutoff frequency may be greater than about 5 MHz (e.g. greater than about 10 MHz).

An effect of step 602 of method 600 is to place frequency content (e.g. frequency spectrum) of the parasitic transient signals in a stopband of first filter 318 having second cutoff frequency. This occurs because frequency content of parasitic transient signals is at a range of frequencies lower than the second cutoff frequency. This may lead to suppression, or at least reduction, of parasitic transient signals that may saturate the ADC of RF transceiver 102.

Figure 7A:
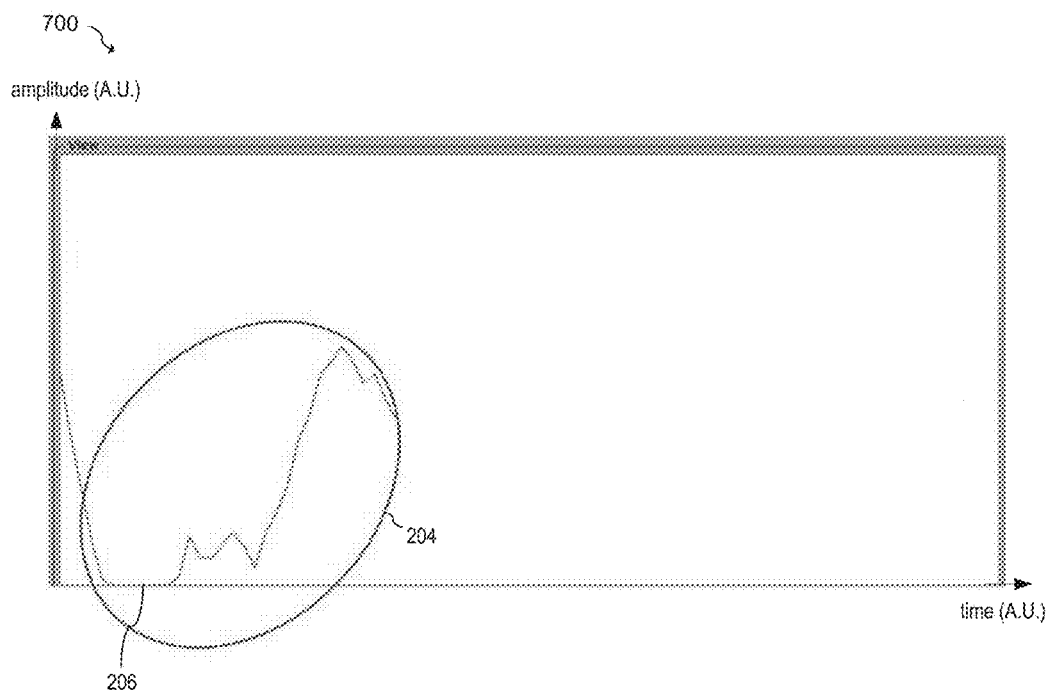
FIGS. 7A to 7C show time-domain behaviour, at the IF, of various signals received at an RF transceiver of a radar system, in accordance with an embodiment.

FIG. 7A shows time-domain behaviour, at the IF, of a signal 700, in accordance with an embodiment. The horizontal axis indicates time (in arbitrary units) while the vertical axis indicates amplitude (in arbitrary units). Signal 700 may be the output of processing circuit 316 (e.g. output signal 326) and shows the effect of performing step 602 of method 600. As illustrated in FIG. 7A, the rapid amplitude spike of first signal portion 202 of signal 200 is absent in the time-domain signal 700. Nonetheless, second portion 204 of signal 200 (having clipping 206) is present in time-domain signal 700.

As described above in relation to FIG. 1, frequency content of reflected RF signal 142, parasitic transient signals, and close-in reflections 144 may be close in the IF domain. Consequently, step 602, although eliminating or substantially reducing parasitic transient signals, may also place frequency content of reflected RF signal 142 and close-in reflections 144 within the stopband of first filter 318. As a result, there may be a need to change the cutoff frequency of first filter 318 from the second cutoff frequency (e.g. greater than about 10 MHz) back to the first cutoff frequency (e.g. in a range of between 35 kHz and about 150 kHz) while RF transceiver 102 is in second mode. In doing so, frequency content of reflected RF signal 142 is placed back into the passband of RF transceiver 102, thereby allowing RF transceiver 102 to process reflected RF signal 142 so that information (e.g. relative speed, distance, position, orientation, or phase) about first object 132 may be obtained.

Referring back to FIG. 2, first signal portion 202 of signal 200 is present for approximately time duration T after RF transceiver 102 changes operation from first mode to second mode, while second signal portion 204 of signal 200 (which includes the signal of interest, namely, reflected RF signal 142) occurs after first signal portion 202. Consequently, much of the effects of the parasitic transient signal are no longer present after time duration T. From this observation, changing of cutoff frequency of first filter 318 from the second cutoff frequency back to the first cutoff frequency may occur a predetermined time after RF transceiver 102 enters second mode. This predetermined time may be time duration T, which may be between about 1 nanosecond and about 50 nanoseconds.

In some embodiments, time duration T may be determined by controller 312. As an example, time duration T may be determined empirically by providing frequency-translated signal 315 to controller 312. In such an example, controller 312 may estimate time duration T by determining a total time needed by signal 200 to exceed and fall below threshold TH. In other words, time duration T may be equal to the total time that the amplitude of signal 200 is above threshold TH. In some embodiments, threshold TH may be set to between about 40 percent and about 60 percent of peak amplitude $A_{MAX}$ of signal 200, although other levels may be possible in other embodiments.

Referring to step 604 of method 600, the frequency of signal received at an antenna of RF transceiver is translated using a local oscillator signal having a calibrated phase shift. Step 604 of method 600 may be performed by mixer 302, controller 312, and selectable LO phase circuit 310. For example, as described above in relation to FIG. 3, controller 312 is configured to determine the calibrated phase shift and control the selectable LO phase circuit 310 to shift the phase of LO signal 306 by the calibrated phase shift to produce calibrated LO signal 311 (which is LO signal having the calibrated phase shift). The calibrated LO signal 311 is subsequently provided to the mixer via LO port 302b, and the signal received at an antenna of RF transceiver 102 is translated, by mixer 302, using calibrated LO signal 311.

An effect of step 604 of method 600 is to place a DC level of the second signal portion 204 of signal 200 close to a center of a dynamic range of the ADC of RF transceiver 102. By centering the DC level of the second signal portion 204 of signal 200 within the ADC input range, a gain of third amplifier 320 (e.g. VGA) and/or the cutoff frequency of first filter 318 may be varied such that the small amplitude variations of reflected RF signal 142 may be discriminated from the large amplitude fluctuation of close-in reflections 144, thereby limiting the effects of close-in reflections 144 while improving processing and detection of reflected RF signal 142. For example, by placing DC level of the second signal portion 204 of signal 200 close to the center of the dynamic range of the ADC of RF transceiver 102, clipping of signal 200 and saturation of at least one of an amplifier or the ADC of RF transceiver 102 are avoided.

Figure 7B:
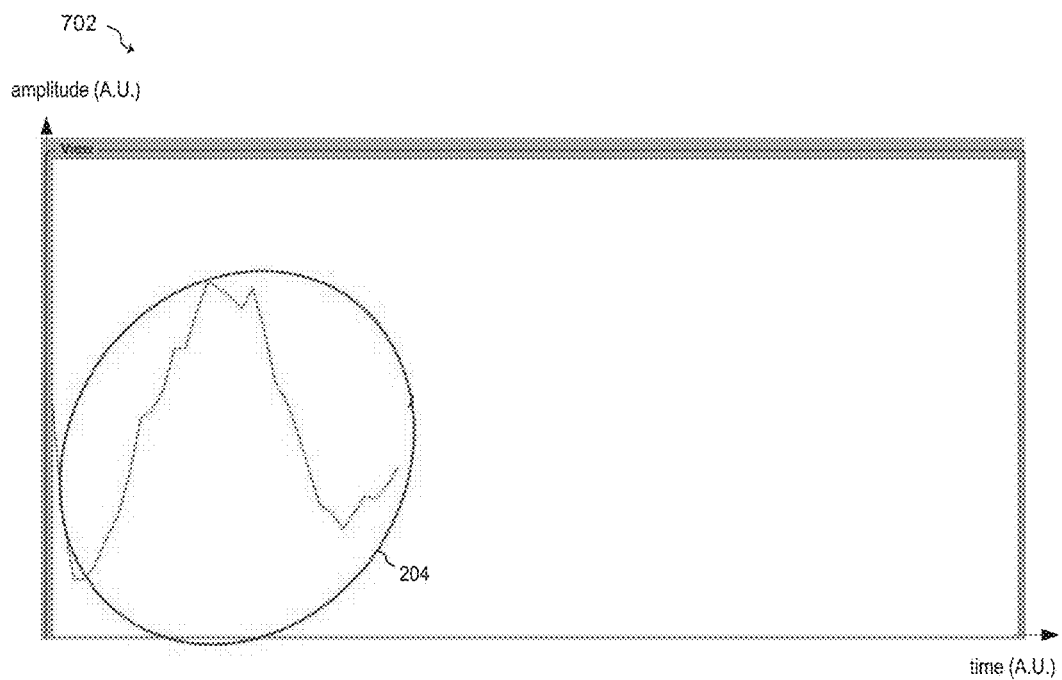

FIG. 7B shows time-domain behaviour, at the IF, of a signal 702, in accordance with an embodiment. The horizontal axis indicates time (in arbitrary units) while the vertical axis indicates amplitude (in arbitrary units). Signal 702 may be the output of processing circuit 316 (e.g. output signal 326) and shows the effect of performing step 604 of method 600. Signal 702 may be obtained by frequency-translating, using the calibrated LO signal 311, the signal received at an antenna of RF transceiver 102 and by setting the cutoff frequency of first filter 318 to the first cutoff frequency (which may be between about 20 kHz and about 200 kHz). As observed in FIG. 7B, the DC level of signal 702 is shifted towards a middle of the vertical axis as compared to signal 700 shown in FIG. 7A. This may be attributed to step 604 of method 600, which, in effect, places the DC level of the second signal portion 204 of signal 200 close to the center of the dynamic range of the ADC of the RF transceiver 102 by frequency translating the signal received at an antenna of RF transceiver 102. As shown in FIG. 7B, clipping 206 is absent due to the DC level of the second signal portion 204 of signal 200 being shifted towards the center of the ADC input range.

As described above in relation to circuit 300 and method 600, selectable LO phase circuit 310 is configured to shift a phase of LO signal 306 by a calibrated phase shift, while controller 312 is configured to determine the calibrated phase shift and control the selectable LO phase circuit 310 to shift the phase of LO signal 306 by the calibrated phase shift to produce calibrated LO signal 311.

Figure 8:
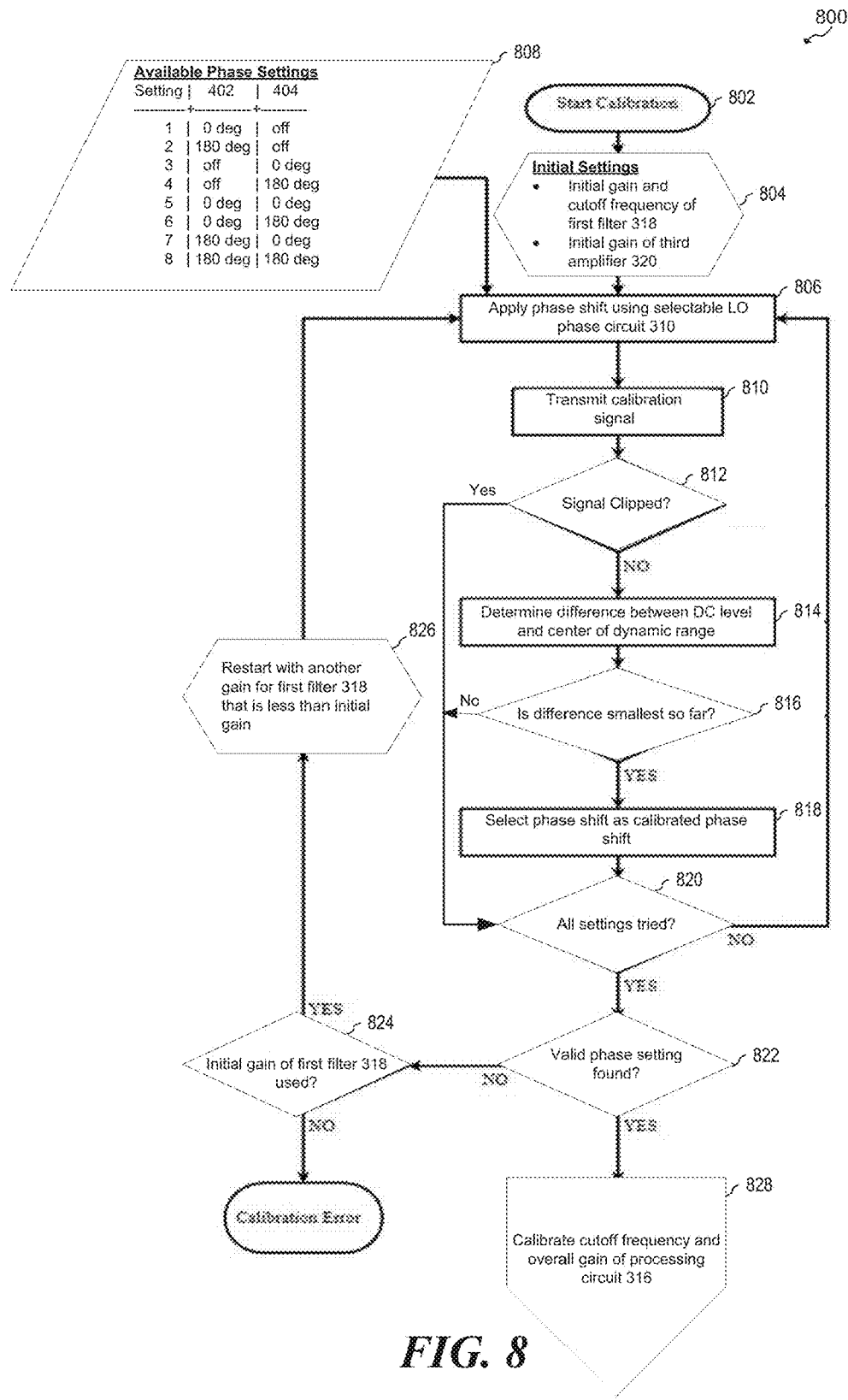
FIG. 8 shows a method for determining a calibrated phase shift of a local oscillator signal, in accordance with an embodiment.

FIG. 8 shows a method 800 for determining the calibrated phase shift, in accordance with an embodiment. The method 800 may be executed by controller 312. Method 800 determines the calibrated phase shift by iteratively selecting a phase shift from a plurality of phase shifts that selectable LO phase circuit 310 is able to provide. The phase shift selected in a given iteration is different from a phase shifted selected in a previous or future iteration. For each iteration, selectable LO phase circuit 310 shifts LO signal 306 by the selected phase shift. A frequency of a signal received at an antenna of RF transceiver 102 is subsequently shifted using the LO signal having the selected phase shift to produce a frequency-translated signal. The frequency-translated signal is processed by processor 316 to produce output signal 326. When controller 312 determines that the amplitude of output signal 326 is not clipped, this may indicate that the DC level of output signal 326 is moved towards the center of the dynamic range of the ADC of the RF transceiver 102. In response to a determination that the amplitude of output signal 326 is not clipped, controller 312 determines how close the DC level of output signal 326 is to the center of the dynamic range of the ADC of the RF transceiver 102. The phase shift that results in output signal 326 having amplitude that is not clipped and a DC level that is closest to the center of the dynamic range of the ADC of the RF transceiver 102 is selected, by controller 312, as the calibrated phase shift.

Referring to step 802 of method 800, controller 312 begins calibration of the RF transceiver 102. Method 800 may be executed by controller 312 at start-up or power up of RF transceiver 102. In some embodiments, controller 312 performs method 800 every X duty cycles, where X may be between about 4 and about 10. Additionally or optionally, the method 800 may be performed in response to a temperature of RF transceiver 102 or a portion thereof being in a predetermined range. For example, controller 312 may perform method 800 in response to the temperature of circuit 300 being between about 70 degrees Celsius and about 85 degrees Celsius.

As shown in step 804, method 800 starts with an initial gain and an initial cutoff frequency of first filter 318, and an initial gain of third amplifier 320. In some embodiments, initial gain of first filter 318 may be between about 10 decibels (dB) and about 50 dB (e.g. about 30 dB). Initial cutoff frequency of first filter 318 may be the first cutoff frequency of first filter 318, which may be between about 20 kHz and about 200 kHz (e.g. about 35 kHz to about 150 kHz). Initial gain of third amplifier 320 may be about 0 dB. A result of setting the initial gain of third amplifier 320 at about 0 dB is that amplitude clipping that occurs during execution of method 800 may be attributed, at least in part, to the DC level of a frequency-translated signal deviating from the center of the dynamic range of the ADC of the RF transceiver 102, and not to saturation of an output of third amplifier 320.

As shown in step 806 of method 800, a phase shift is applied, by selectable LO phase circuit 310, to LO signal 306. The phase shift applied is selected from a plurality of phase shifts (indicated as available phase settings 808 in FIG. 8). In some embodiments, the available phase settings 808 may depend, at least in part, on circuitry of selectable LO phase circuit 310. For example, in the embodiment where selectable LO phase circuit 310 is implemented by the I-Q vector modulator 400 shown in FIG. 4, the available phase settings 808 depend on a state of each of first ON/OFF bi-phase modulator 402 and second ON/OFF bi-phase modulator 404. Each of first ON/OFF bi-phase modulator 402 and second ON/OFF bi-phase modulator 404 may have a first state (e.g. an OFF state), a second state that provides a 0 degree phase shift to a signal at an input of the bi-phase modulator, and a third state that provides a 180 degree phase shift to a signal at an input of the bi-phase modulator. In the example shown in step 808 of method 800, I-Q vector modulator 400 provides eight different phase settings depending on the relative states of first ON/OFF bi-phase modulator 402 and second ON/OFF bi-phase modulator 404.

Referring to step 810 of method 800, a calibration signal is transmitted using RF transceiver 102 (e.g. using at least one of transmit antenna 120a or transmit antenna 120b). In embodiments where radar system 100 is implemented as a FMCW radar sensor, the calibration signal may be, or may include, a chirp signal. A reflection of the calibration signal (e.g. off second object 146) is received at an antenna of RF transceiver 102 (e.g. receive antennas 122a-d), and the reflection of the calibration signal is frequency-translated using LO signal 306 having the phase shifted applied in step 806.

Processing circuit 316 processes the frequency-translated reflection of the calibration signal to produce a first phase test signal. In some embodiments, the first phase test signal may be the output signal 326 of processing circuit 316. In some embodiments, such as in the example shown in FIG. 3, processing the frequency-translated reflection of the calibration signal may include filtering, using first filter 318 having the first cutoff frequency, the frequency-translated reflection of the calibration signal, and amplifying, using third amplifier 320 having the initial gain setting (e.g. about 0 dB), the filtered frequency-translated reflection of the calibration signal.

Referring to step 812 of method 800, controller 312 determines whether amplitude of first phase test signal is clipped. In some embodiments, controller 312 determines whether the amplitude of first phase test signal is clipped by processing a histogram of the first phase test signal. For example, controller 312 may apply at least one of Iterated Logarithm Amplitude Histogram (ILAH) analysis, Least Squares Residuals (LSR) analysis, or Least Squares Residuals Iterated Logarithm Amplitude Histogram (LILAH) analysis on the histogram of the first phase test signal to determine whether amplitude of first phase test signal is clipped. In some embodiments, a simple amplitude range check of first phase test signal may be used to determine whether the amplitude of first phase test signal is clipped.

A determination that the amplitude of the first phase test signal is clipped may indicate that the DC level of first phase test signal is not close enough to the center of the dynamic range of the ADC of the RF transceiver 102 to avoid clipping. This, in turn, implies that LO signal having the first phase shift may not sufficiently shift the DC level of output signal 326 towards the center of the dynamic range of the ADC of the RF transceiver 102. As such, another phase shift needs to be selected, from the plurality of phase shifts, for LO signal 306. Consequently, as shown in FIG. 8, in response to a determination that the amplitude of the first phase test signal is clipped, controller 312 may determine whether all available phase settings 808 have been attempted (in step 820). In response to a determination that there is at least one available phase setting that has not been selected and tried, a new iteration is performed where a second phase shift, different from the first phase shift, is selected from the available phase settings 808 (e.g. indicated in the transition from step 820 to step 806). This second phase shift is applied, in step 806, to LO signal 306. The RF transceiver 102 repeats the transmission of the calibration signal (in step 810), and the reflection of the calibration signal is received at the antenna of the RF transceiver 102. The reflection of the calibration signal is subsequently frequency translated using the LO signal 306 having the second phase shift. Processing circuit 316 processes the frequency-translated reflection of the calibration signal to produce a second phase test signal, which is different from the first phase test signal. In step 812 of this new iteration, controller 312 determines whether amplitude of the second phase test signal is clipped.

On the other hand, a determination that the amplitude of the first phase test signal is not clipped may indicate that the DC level of first phase test signal is close enough to the center of the dynamic range of the ADC of the RF transceiver 102 to avoid clipping. This, in turn, implies that LO signal having the first phase shift may sufficiently shift the DC level of output signal 326 towards the center of the dynamic range of the ADC of the RF transceiver 102. Consequently, as shown in step 814 of method 800, in response to a determination that the amplitude of the first phase test signal is not clipped, controller 312 determines a difference between the DC level of the first phase test signal and the center of the dynamic range of the ADC of the RF transceiver 102. In some embodiments, controller 312 may determine the DC level of first phase test signal by determining a root mean square (RMS) value of the first phase test signal, although other methods of determining the DC level of first phase test signal may be possible in other embodiments. In some embodiments, the difference between the DC level of the first phase test signal and the center of the dynamic range of the ADC of the RF transceiver 102 is stored in computer-readable memory that may be included in RF transceiver 102.

Referring to step 816 of method 800, controller 312 determines whether the difference determined in step 814 is the smallest difference determined so far. A determination that there is a smaller difference may indicate that LO signal 306 having a phase shift selected in a previous iteration may shift the DC level of output signal 326 closer towards the center of the dynamic range of the ADC of the RF transceiver 102 than LO signal 306 having the first phase shift. Consequently, as shown in FIG. 8, in response to a determination that there is a smaller difference, controller 312 may determine whether all available phase settings 808 have been attempted (in step 820). In response to a determination that there is at least one available phase setting that has not been selected and tried, a new iteration is performed where a further phase shift, different from the first phase shift and the previously selected phase shift, is selected from the available phase settings 808 (e.g. indicated in the transition from step 820 to step 806). This further phase shift is applied, in step 806, to LO signal 306. The RF transceiver 102 repeats the transmission of the calibration signal (in step 810), and the reflection of the calibration signal is received at the antenna of the RF transceiver 102. The reflection of the calibration signal is subsequently frequency translated using the LO signal having the further phase shift. Processing circuit 316 processes the frequency-translated reflection of the calibration signal to produce a further phase test signal, which is different from the first phase test signal. In step 812 of this new iteration, controller 312 determines whether amplitude of the further phase test signal is clipped.

On the other hand, a determination that there is not a smaller difference may indicate that LO signal having the first phase shift is the most effective, up until the present iteration, in shifting the DC level of output signal 326 towards the center of the dynamic range of the ADC of the RF transceiver 102. Consequently, as shown in step 818 of method 800, in response to a determination that there is not a smaller difference, controller 312 selects the currently selected phase shift (e.g. first phase shift) as the calibrated phase shift.

Referring to step 820 of method 800, controller 312 determines whether all phase shifts of the plurality of phase shifts have been applied to LO signal 306. A determination that not all phase shifts have been applied to LO signal 306 may indicate that there may be yet another phase shift that may shift the DC level of output signal 326 closer towards the center of the dynamic range of the ADC of the RF transceiver 102 than the LO signal having the first phase shift. As such, it may be desirable to perform yet another iteration of method 800 using a phase shift not previously selected. Consequently, in response to a determination that not all phase shifts of the plurality of phase shifts have been applied to LO signal 306, method 800 proceeds by applying yet another phase shift, selected from the available phase settings, to LO signal 306 (indicated in 806).

On the other hand, in response to a determination that all phase shifts of the plurality of phase shifts have been applied to LO signal 306, then method 800 proceeds with controller 312 determining whether a valid phase setting is found (in step 822). As an example, each of the available phase settings 808 may lead to a determination that the amplitude of the first phase test signal is clipped (e.g. in step 812), and this is indicative that no valid phase setting has been found. On the other hand, if at least one of the available phase settings 808 results in the amplitude of the first phase test signal not being clipped (e.g. in step 812), this may be indicative that a valid phase setting has been found.

A determination that no valid phase setting has been found may indicate that the initial gain of first filter 318 may be too high and that the phase calibration steps described above may need to be repeated with a lower gain for first filter 318. Consequently, in response to a determination no valid phase setting has been found, method 800 continues with a determination, by controller 318, whether the initial gain of first filter 318 was used (in step 824). If so, controller 318 reduces the gain of first filter 318 (in step 826) and repeats step 806, where a phase shift is selected from the plurality of phase shifts and applied to LO signal 306. Controller 312 may reduce the gain of first filter 318 by changing a resistance of feedback resistor 504.

On the other hand, if it is determined in step 822 that a valid phase setting has been found, then controller 312 uses the phase shift determined in step 818 as the calibrated phase shift and controls the selectable LO phase circuit 310 to shift the phase of LO signal 306 by the calibrated phase shift.

The steps described above in relation to FIG. 8 may occur with an initial gain of third amplifier 320 being set to a predetermined value (e.g. 0 dB). However, following the determination in step 822 that a valid phase setting has been found, the cutoff frequency and the overall gain provided by processing circuit 316 may be varied (e.g. increased) so that the low amplitude deviations of output signal 326 caused by reflected RF signal 142 may be amplified as much as possible without causing clipping of output signal 326, thereby improving detection of reflected RF signal 142 by RF transceiver 102. Consequently, as shown in step 828 of method 800, calibration of the cutoff frequency and overall gain of processing circuit 316 is performed in response to a determination that that a valid phase setting has been found.

Referring back to FIG. 3, processing circuit 316 includes first filter 318, third amplifier 320, second filter 322, and fourth amplifier 324. Consequently, the cutoff frequency and overall gain of processing circuit 316 may be adjusted, at least in part, by varying cutoff frequencies of first filter 318 and/or second filter 322 and gains of third amplifier 320 and/or fourth amplifier 324.

Figure 7C:
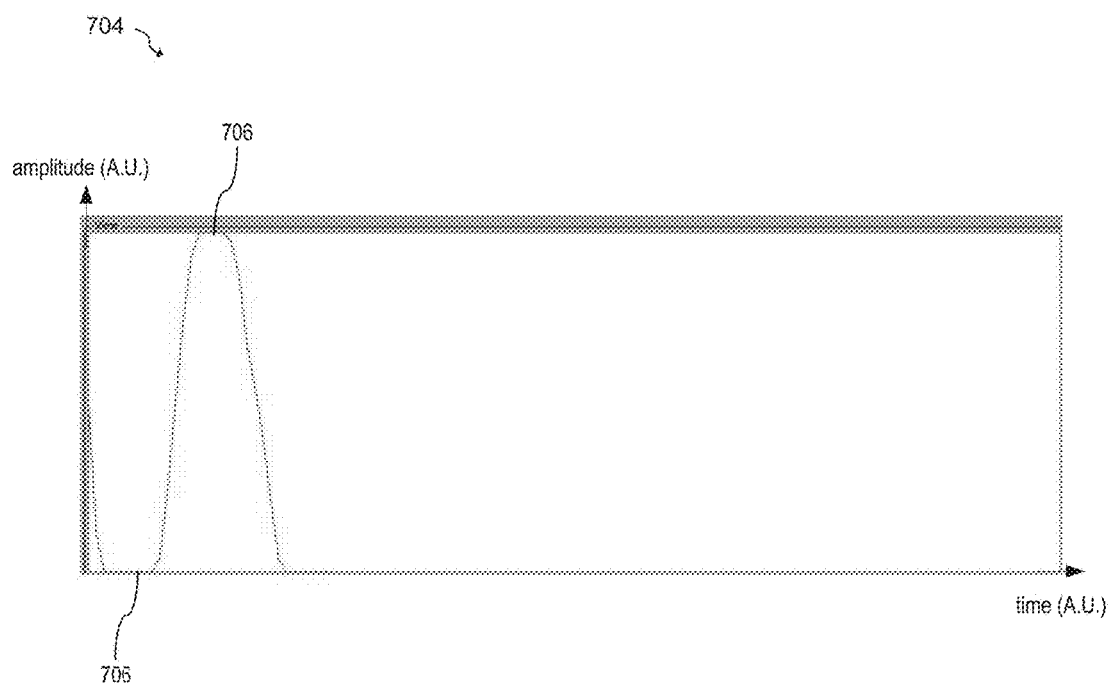

FIG. 7C shows the time-domain behaviour, at the IF, of a signal 704, in accordance with an embodiment. The horizontal axis indicates time (in arbitrary units) while the vertical axis indicates amplitude (in arbitrary units). Signal 704 may be the output of processing circuit 316 (e.g. output signal 326) and shows how signal 702 (shown in FIG. 7B) is amplified by changing a cutoff frequency of first filter 318. In particular, signal 702 is amplified by reducing a cutoff frequency of first filter 318, thereby producing signal 704 shown in FIG. 7C. For example, signal 704 may be obtained by changing the cutoff frequency of first filter 318 from between about 100 kHz and about 200 kHz (such as about 150 kHz) to between about 20 kHz and about 50 kHz (such as about 35 kHz). Consequently, the overall gain of processing circuit 316 may be increased by reducing a cutoff frequency of first filter 318. In the example shown in FIG. 7C, the overall gain of processing circuit 316 is increased to an extent that clipping occurs (indicated in FIG. 7C as regions 706). As such, the overall gain of processing circuit 316 may need to be reduced so that clipping 706 may be avoided. Reduction of the overall gain of processing circuit 316 may be accomplished by increasing the cutoff frequency of first filter 318, reducing the gain of third amplifier 320, or both. The overall gain of processing circuit 316 that maximizes signal amplification while avoiding clipping of output signal 326 may be referred to as a calibrated gain of processing circuit 316.

Figure 9:
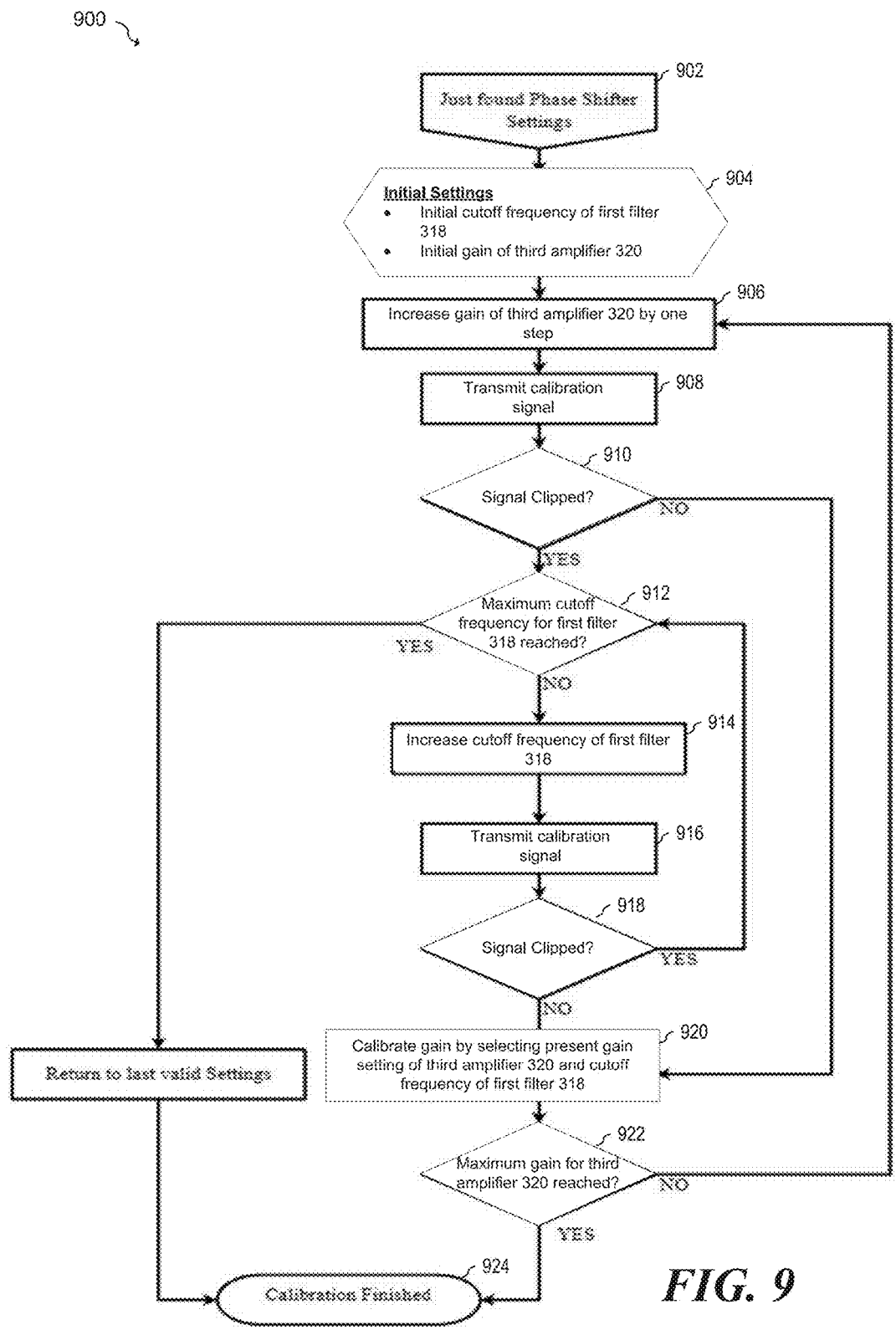
FIG. 9 shows a method for determining a calibrated gain and cutoff frequency of a processing circuit of an RF transceiver of a radar system, in accordance with an embodiment.

FIG. 9 shows a method 900 for determining the calibrated gain and cutoff frequency of processing circuit 316, in accordance with an embodiment. The method 900 may be executed by controller 312. Method 900 varies the gain of third amplifier 320 and/or cutoff frequency of first filter 318 with each iteration so that the low amplitude deviations of output signal 326 caused by reflected RF signal 142 may be amplified as much as possible without causing clipping of output signal 326, thereby improving detection of reflected RF signal 142 by RF transceiver 102.

Referring to step 902 of method 900, controller 312 begins gain calibration of processing circuit 316 of RF transceiver 102 following determination of calibrated phase shift in method 800. Referring to step 904 of method 900, gain calibration may be commenced with third amplifier 320 having an initial gain (e.g. about 0 dB) and first filter having an initial cutoff frequency (e.g. first cutoff frequency, which may be between about 20 kHz and about 200 kHz, such as between about 35 kHz and 150 kHz). Referring to step 906, controller 316 may increase the gain of third amplifier 320 from the initial gain to a first gain setting. In some embodiments, third amplifier 320 may be a VGA, and controller 316 may be communicatively coupled to third amplifier 320 to control a gain of the third amplifier 320. In some embodiments, the gain of third amplifier 320 may be changed in discrete steps, starting from the initial gain. In such embodiments, third amplifier 320 may have a plurality of predetermined gain settings, and controller 316 may be configured to select, in step 906, a gain setting from one of the predetermined gain settings.

Referring to step 908, a calibration signal is transmitted using RF transceiver 102 (e.g. using at least one of transmit antenna 120a or transmit antenna 120b). In the embodiment where radar system 100 is implemented as a FMCW radar sensor, the calibration signal may be, or may include, a chirp signal. A reflection of the calibration signal (e.g. off second object 146) is received at an antenna of RF transceiver 102

(e.g. receive antennas 122a-d), and the reflection of the calibration signal is frequency-translated using LO signal 306 having the calibrated phase shift determined in method 800.

Processing circuit 316 processes the frequency-translated reflection of the calibration signal to produce a first gain test signal. In some embodiments, the first gain test signal may be the output signal 326 of processing circuit 316. In some embodiments, such as in the example shown in FIG. 3, processing the frequency-translated reflection of the calibration signal may include filtering, using first filter 318 having the first cutoff frequency, the frequency-translated reflection of the calibration signal, and amplifying, using third amplifier 320 having the first gain setting, the filtered frequency-translated reflection of the calibration signal.

Referring to step 910 of method 900, controller 312 determines whether amplitude of first gain test signal is clipped (e.g. using one or more of the methods described above in relation to step 812 of method 800). A determination that the amplitude of the first gain test signal is not clipped may indicate that the settings of third amplifier 320 and first filter 318 in the given iteration (e.g. first gain setting of third amplifier 320 and the first cutoff frequency of first filter 318) may provide increased overall gain of processing circuit 316 without causing clipping of output signal 326. As such, as indicated in step 920 of method 900, the present gain setting of third amplifier 320 and cutoff frequency of first filter 318 are selected for processing circuit 316.

On the other hand, a determination that the amplitude of the first gain test signal is clipped may indicate that the overall gain of processing circuit 316 needs to be reduced. As described above in relation to FIG. 7C, this reduction in the overall gain of processing circuit 316 may be accomplished by increasing the cutoff frequency of first filter 318. Consequently, in response to a determination that the amplitude of the first gain test signal is clipped, controller 312 determines, in step 912 of method 900, whether the maximum cutoff frequency for first filter 318 is reached. As shown in step 914 of method 900, controller 312 increases the cutoff frequency of first filter 318 (e.g. by varying a resistance of feedback resistor 504), if controller 312 determines that the maximum cutoff frequency of first filter 318 has not been reached. In this iteration, the cutoff frequency may be changed from the first cutoff frequency to a higher cutoff frequency (e.g. a third cutoff frequency). In some embodiments, the third cutoff frequency may still be between about 20 kHz and about 200 kHz, such as between about 35 kHz and 150 kHz. However, the third cutoff frequency is less than the second cutoff frequency, which, as described above in respect of closing switch 502 when RF transceiver 102 switches operation from first mode to second mode, may be greater than about 5 MHz (e.g. greater than about 10 MHz).

Subsequent to step 914, RF transceiver 102 repeats the transmission of the calibration signal (in step 916 of method 900), and the reflection of the calibration signal is received at the antenna of the RF transceiver 102. The reflection of the calibration signal is subsequently frequency translated using the LO signal 306 having the calibrated phase shift determined in method 800. Processing circuit 316 processes the frequency-translated reflection of the calibration signal to produce a second gain test signal, which is different from the first gain test signal. In particular, the frequency-translated reflection of the calibration signal is filtered using first filter 318 having the third cutoff frequency and amplified using third amplifier 320 having the first gain setting.

In step 918 of method 900, controller 312 determines whether amplitude of the second gain test signal is clipped (e.g. using one or more of the methods described above in relation to step 812 of method 800). A determination that the amplitude of the second phase test signal is clipped may indicate that the overall gain of processing circuit 316 needs to be reduced even further. As described above in relation to FIG. 7C, this reduction in the overall gain of processing circuit 316 may be accomplished by increasing the cutoff frequency of first filter 318. Consequently, in response to a determination that the amplitude of the second gain test signal is clipped, controller 312 repeats steps 912, 914, 916, and 918 in further iterations until cutoff frequency of first filter 318 cannot be increased any further.

On the other hand, a determination that the amplitude of second gain test signal is not clipped may indicate that the current settings of third amplifier 320 and first filter 318 (e.g. first gain setting of third amplifier 320 and the third cutoff frequency of first filter 318) may provide increased overall gain of processing circuit 316 without causing clipping of output signal 326. As such, as indicated in step 920 of method 900, the present gain setting of third amplifier 320 and cutoff frequency of first filter 318 are selected for processing circuit 316.

Method 900 proceeds from step 920 to step 922, where controller 312 determines whether the maximum gain setting for third amplifier 320 has been reached. A determination that the maximum gain of third amplifier 320 has not been reached may indicate that the gain of third amplifier 320 may be further increased, thereby increasing the overall gain provided by processing circuit 316. The increased overall gain may aid in accentuating low amplitude deviations caused by reflected RF signal 142 so that information (e.g. relative speed, distance, position, orientation, or phase) about first object 132 may be obtained. Consequently, in response to a determination that the maximum gain of third amplifier 320 has not been reached, method 900 proceeds with a new iteration where the gain of third amplifier 320 is increased to the next available gain setting (in step 906).

On the other hand, a determination that the maximum gain of third amplifier 320 has been reached may indicate that the overall gain provided by processing circuit 316 may not be increased further. As such, in response to a determination that the maximum gain of third amplifier is reached, controller 312 determines that calibration of RF transceiver 102 is completed (in step 924). It is noted from FIG. 9, that when controller 312 determines, in step 912, that the maximum cutoff frequency of first filter 318 has been reached, such a determination may indicate that the selected gain of third amplifier 320 and the selected cutoff frequency of first filter 318 are invalid selections since these settings result in clipping of the amplitude of the test signal. Consequently, as indicated in FIG. 9, in response to a determination, in step 912, that the maximum cutoff frequency of first filter 318 has been reached, method 900 proceeds to step 926, where the most recent valid settings for the cutoff frequency of first filter 318 and the gain of third amplifier 320 are selected as the calibrated cutoff frequency of first filter 318 and the calibrated gain of third amplifier 320.

In summary, operating circuit 300 in accordance with method 600 may remove, or at least reduce, effects (such as ADC saturation and amplitude clipping) caused by close-in reflections 144 and the parasitic transient signals generated when the radar system 100 switches operation from first mode to second mode. Furthermore, method 800 may be executed by controller 312 to determine the calibrated phase shift based on a phase calibration that sets a direct current (DC) level of a phase test signal at an intermediate frequency. In essence, method 800 determines the calibrated phase shift by iteratively selecting a phase shift from a plurality of phase shifts that selectable LO phase circuit 310 is able to provide. The phase shift that results in output signal 326 having amplitude that is not clipped and a DC level that is closest to the center of the dynamic range of the ADC of the RF transceiver 102 is selected, by controller 312, as the calibrated phase shift. Even further, method 900 may be executed by controller 312 to determine the calibrated gain based on a gain calibration that reduces an amplitude clipping of a gain test signal. Method 900 provides a method for increasing the overall gain provided by processing circuit 316 so that the low amplitude deviations of output signal 326 caused by reflected RF signal 142 may be amplified as much as possible without causing clipping of output signal 326, thereby improving detection of reflected RF signal 142 by RF transceiver 102.

In an embodiment, a method includes frequency-translating, using a local oscillator signal having a calibrated phase shift, a signal received at an antenna of a radio frequency (RF) transceiver; filtering the frequency-translated signal using a programmable filter of the RF transceiver to produce a filtered frequency-translated signal; and changing a cutoff frequency of the programmable filter from a first cutoff frequency to a second cutoff frequency in response to the RF transceiver switching operation from a first mode to a second mode.

In an embodiment, a circuit includes a mixer having an input port configured to be coupled to an antenna of a radio frequency (RF) transceiver; and a selectable local oscillator (LO) phase circuit coupled to an LO port of the mixer, the selectable LO phase circuit configured to provide a calibrated phase shift to a local oscillator signal. The circuit further includes a filter coupled to an output of the mixer, the filter having a selectable cutoff frequency; and a controller coupled to the filter, wherein the controller is configured to change a cutoff frequency of the filter from a first cutoff frequency to a second cutoff frequency in response to the RF transceiver switching operation from a first mode to a second mode.

In an embodiment, a radar system includes a transmit antenna configured to transmit a radar signal; and a receive antenna configured to receive a reflected radar signal, the reflected radar signal including at least one of a parasitic signal generated by a coupling between the receive antenna and the transmit antenna or a local echo signal generated by a reflection of the radar signal from a stationary target in close proximity to the transmit antenna and receive antenna. The radar system further includes a mixer coupled to the receive antenna and configured to downconvert, using a local oscillator signal having a calibrated phase shift, the reflected radar signal to produce a downconverted reflected radar signal. The radar system additionally includes a processing circuit coupled to an output of the mixer, the processing circuit including a filter having a first bandwidth, the filter being configured to filter the downconverted reflected radar signal; and a controller configured to change a bandwidth of the filter from the first bandwidth to a second bandwidth in response to the radar system switching operation from an inactive mode to an active mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
frequency-translating, using a local oscillator signal having a calibrated phase shift, a signal received at an antenna of a radio frequency (RF) transceiver;
filtering the frequency-translated signal using a programmable filter of the RF transceiver to produce a filtered frequency-translated signal;
changing a cutoff frequency of the programmable filter from a first cutoff frequency to a second cutoff frequency in response to the RF transceiver switching operation from a first mode to a second mode;
operating the RF transceiver in the second mode with the programmable filter having the second cutoff frequency for a first predetermined duration of time;
changing the cutoff frequency of the programmable filter from the second cutoff frequency to the first cutoff frequency while the RF transceiver is in the second mode and after the first predetermined duration of time has elapsed; and
operating the RF transceiver in the second mode with the programmable filter having the first cutoff frequency after changing the cutoff frequency of the programmable filter from the second cutoff frequency to the first cutoff frequency.

2. The method of claim 1, wherein frequency-translating comprises downconverting.

3. The method of claim 1, further comprising:
determining the calibrated phase shift based on a phase calibration that sets a direct current (DC) level of a frequency-translated signal; and
shifting a phase of the local oscillator signal by the calibrated phase shift.

4. The method of claim 3, wherein determining the calibrated phase shift comprises:
shifting a phase of the local oscillator signal by a first phase shift;
transmitting, using the RF transceiver, a calibration signal;
frequency-translating, using the local oscillator signal having the first phase shift, a reflection of the calibration signal received at the antenna of the RF transceiver to produce a frequency-translated reflection of the calibration signal;
processing, using the RF transceiver, the frequency-translated reflection of the calibration signal to produce a first phase test signal; and
determining whether an amplitude of the first phase test signal is clipped.

5. The method of claim 4, wherein the amplitude of the first phase test signal is clipped, and wherein the method further comprises:
shifting a phase of the local oscillator signal by a second phase shift different from the first phase shift;
transmitting, using the RF transceiver, the calibration signal;
frequency-translating, using the local oscillator signal having the second phase shift, the reflection of the calibration signal received at the antenna of the RF transceiver to produce a frequency-translated reflection of the calibration signal;
processing, using the RF transceiver, the frequency-translated reflection of the calibration signal to produce a second phase test signal; and determining whether an amplitude of the second phase test signal is clipped.

6. The method of claim 4, wherein the amplitude of the first phase test signal is not clipped, and wherein the method further comprises:
determining a DC level of the first phase test signal;
determining a difference between the DC level of the first phase test signal and a center of a dynamic range of an analog-to-digital convertor (ADC) of RF transceiver; and
determining whether a further difference has been determined, the further difference being a difference between a DC level of a third phase test signal and the center of the dynamic range of the ADC, the third phase test signal having an amplitude that is not clipped.

7. The method of claim 6, wherein the further difference has been determined, and wherein the method further comprises:
selecting, as the calibrated phase shift, a phase shift corresponding to a smaller of the differences.

8. The method of claim 6, wherein the further difference has not been determined, and wherein the method further comprises:
selecting the first phase shift as the calibrated phase shift.

9. The method of claim 1, wherein the first predetermined duration of time is between about 1 nanosecond and about 50 nanoseconds.

10. The method of claim 1, wherein the first mode is an inactive mode of the RF transceiver, and wherein the second mode is an active mode of the RF transceiver.

11. The method of claim 1, wherein the first cutoff frequency is between about 20 kHz to about 50 kHz, and wherein the second cutoff frequency is greater than about 10 MHz.

12. The method of claim 1, further comprising:
amplifying the filtered frequency-translated signal by a calibrated gain.

13. The method of claim 12, further comprising:
determining the calibrated gain based on a gain calibration and a cutoff frequency calibration that reduces an amplitude clipping of a gain test signal.

14. The method of claim 13, wherein determining the calibrated gain comprises:
increasing a gain of an amplifier of the RF transceiver from an initial gain setting to a first gain setting;
shifting a phase of the local oscillator signal by the calibrated phase shift;
transmitting, using the RF transceiver, a calibration signal;
frequency-translating, using the local oscillator signal having the calibrated phase shift, a reflection of the calibration signal to produce a frequency-translated reflection of the calibration signal;
filtering, using the programmable filter having the first cutoff frequency, the frequency-translated reflection of the calibration signal to produce a filtered frequency-translated reflection of the calibration signal;
amplifying, using the amplifier having the first gain setting, the filtered frequency-translated reflection of the calibration signal to produce a first gain test signal; and
determining whether an amplitude of the first gain test signal is clipped.

15. The method of claim 14, wherein the amplitude of the first gain test signal is not clipped, and wherein the method further comprises selecting the first gain setting as the gain of the amplifier and the first cutoff frequency as a cutoff frequency of the programmable filter.

16. The method of claim 14, wherein the amplitude of the first gain test signal is clipped and the first cutoff frequency is less than a maximum cutoff frequency of the programmable filter, and wherein the method further comprises:
increasing a cutoff frequency of the programmable filter from the first cutoff frequency to a third cutoff frequency;
transmitting, using the RF transceiver, the calibration signal;
frequency-translating, using the local oscillator signal having the calibrated phase shift, the reflection of the calibration signal to produce the frequency-translated reflection of the calibration signal;
filtering, using the programmable filter having the third cutoff frequency, the frequency-translated reflection of the calibration signal to produce a filtered frequency-translated reflection of the calibration signal;
amplifying, using the amplifier having the first gain setting, the filtered frequency-translated reflection of the calibration signal to produce a second gain test signal; and
determining whether an amplitude of the second gain test signal is clipped.

17. The method of claim 16, wherein the amplitude of the second gain test signal is not clipped, and wherein the method further comprises selecting the first gain setting as the gain of the amplifier and the third cutoff frequency as the cutoff frequency of the programmable filter.

18. A circuit, comprising:
a mixer having an input port configured to be coupled to an antenna of a radio frequency (RF) transceiver;
a selectable local oscillator (LO) phase circuit coupled to an LO port of the mixer, the selectable LO phase circuit configured to provide a calibrated phase shift to a local oscillator signal;
a filter coupled to an output of the mixer, the filter having a selectable cutoff frequency; and
a controller coupled to the filter, wherein the controller is configured to:
change a cutoff frequency of the filter from a first cutoff frequency to a second cutoff frequency in response to the RF transceiver switching operation from a first mode to a second mode;
operate the RF transceiver in the second mode with the filter having the second cutoff frequency for a first predetermined duration of time;
change the cutoff frequency of the filter from the second cutoff frequency to the first cutoff frequency while the RF transceiver is in the second mode and after the first predetermined duration of time has elapsed; and
operate the RF transceiver in the second mode with the filter having the first cutoff frequency after changing the cutoff frequency of the filter from the second cutoff frequency to the first cutoff frequency.

19. The circuit of claim 18, wherein the controller is further configured to provide the calibrated phase shift to the selectable LO phase circuit.

20. The circuit of claim 18, further comprising:
an oscillator coupled to an input port of the selectable LO phase circuit and configured to provide the local oscillator signal.

21. The circuit of claim 18, wherein the filter comprises an active high-pass filter having a cutoff frequency selection switch, and wherein the controller is configured to close the cutoff frequency selection switch to change the cutoff frequency of the filter from the first cutoff frequency to the second cutoff frequency in response to the RF transceiver switching operation from the first mode to the second mode.

22. The circuit of claim 18, wherein the controller is further configured to determine the calibrated phase shift based on a phase calibration that sets a direct current (DC) level of a phase test signal at an intermediate frequency.

23. The circuit of claim 22, further comprising an amplifier coupled to an output of the filter, wherein:
   the mixer is further configured to frequency-translate, using the local oscillator signal having a first phase shift, a reflection of a calibration signal received at the antenna to produce a frequency-translated signal;
   the filter, having the first cutoff frequency, is further configured to filter the frequency-translated signal to produce a filtered frequency-translated signal;
   the amplifier is configured to amplify the filtered frequency-translated signal by an initial gain setting to produce a first phase test signal; and
   the controller is further configured to determine whether an amplitude of the first phase test signal is clipped.

24. The circuit of claim 23, wherein the initial gain setting is set to 0 dB.

25. The circuit of claim 23, wherein the amplitude of the first phase test signal is not clipped, and wherein the controller is further configured to:
   determine a DC level of the first phase test signal;
   determine a difference between the DC level of the first phase test signal and a center of a dynamic range of an analog-to-digital convertor (ADC) coupled to the amplifier; and
   determine whether a further difference has been determined, the further difference being a difference between a DC level of a third phase test signal and the center of the dynamic range of the ADC, the third phase test signal having an amplitude that is not clipped.

26. The circuit of claim 25, wherein the further difference has been determined, and wherein the controller is further configured to select, as the calibrated phase shift, a phase shift corresponding to a smaller of the differences.

27. The circuit of claim 25, wherein the further difference has not been determined, and wherein the controller is further configured to select, as the calibrated phase shift, a phase shift corresponding to a smaller of the differences.

* * * * *